United States Patent [19]

Stark

[11] 4,252,067
[45] Feb. 24, 1981

[54] SIDE WALL FOR RAILWAY HOPPER CAR

[75] Inventor: Marvin Stark, Houston, Tex.

[73] Assignee: Pullman Incorporated, Chicago, Ill.

[21] Appl. No.: 949,472

[22] Filed: Oct. 10, 1978

[51] Int. Cl.² .............................................. B61D 7/00
[52] U.S. Cl. ................................. 105/406 R; 296/181
[58] Field of Search ............... 105/406, 355, 409, 410, 105/396, 404; 296/32, 181, 187

[56] References Cited

U.S. PATENT DOCUMENTS

| 1,703,757 | 2/1929 | Wine | 105/406 R |
|---|---|---|---|
| 2,140,268 | 12/1938 | Moss | 105/249 |
| 2,865,309 | 12/1958 | Lich | 105/406 R |
| 2,885,971 | 5/1959 | Shaver et al. | 105/406 R |
| 3,094,351 | 7/1963 | Gwinn, Jr. | 296/184 |
| 3,240,168 | 3/1966 | Charles et al. | 105/406 R |
| 3,772,997 | 11/1973 | Heap | 105/406 R |

Primary Examiner—Richard A. Bertsch
Attorney, Agent, or Firm—Richard J. Myers

[57] ABSTRACT

A side wall arrangement for an open top hopper or railway gondola car having a metal plate construction and including top chord or sill members spanning the outside top edges of the walls. The top chord members are of a lightweight unitary formed plate construction providing axial and lateral rigidification for the wall so as to resist lateral warping or deflection thereof during rotary dumping operations.

15 Claims, 4 Drawing Figures

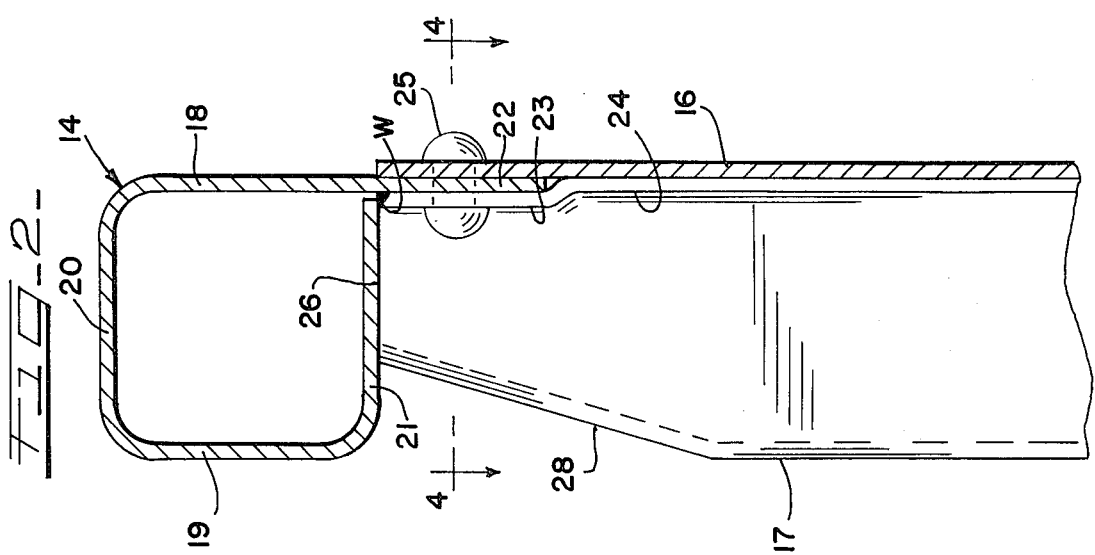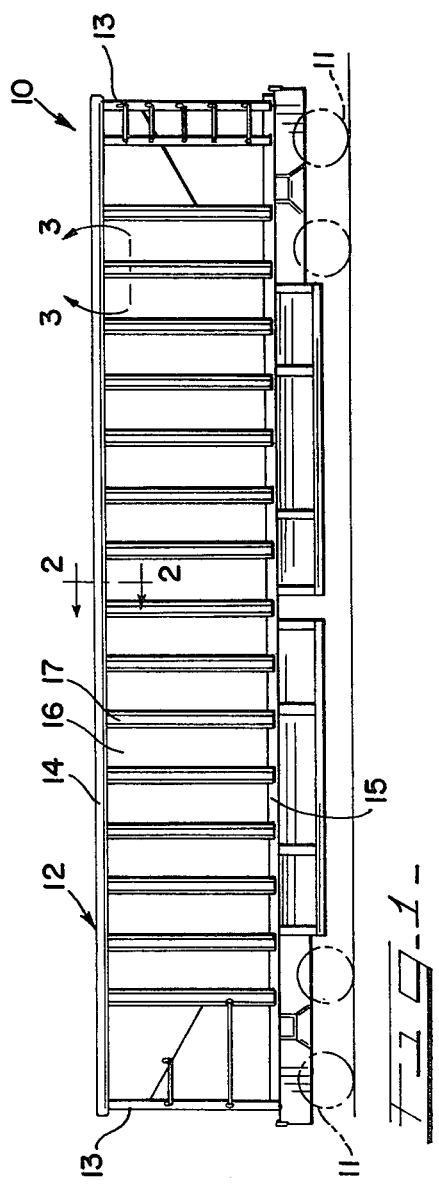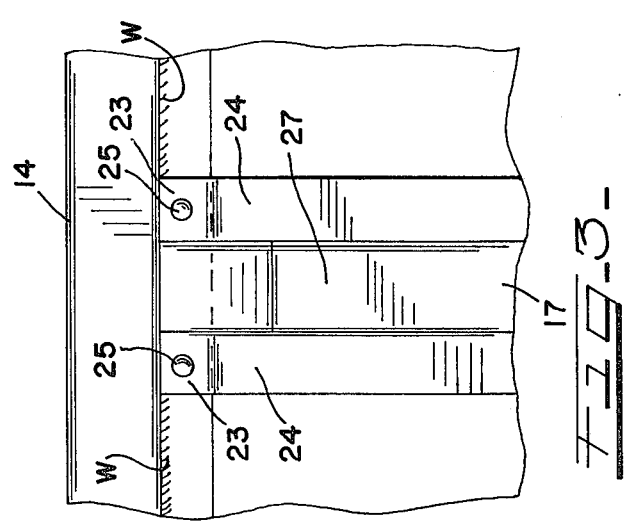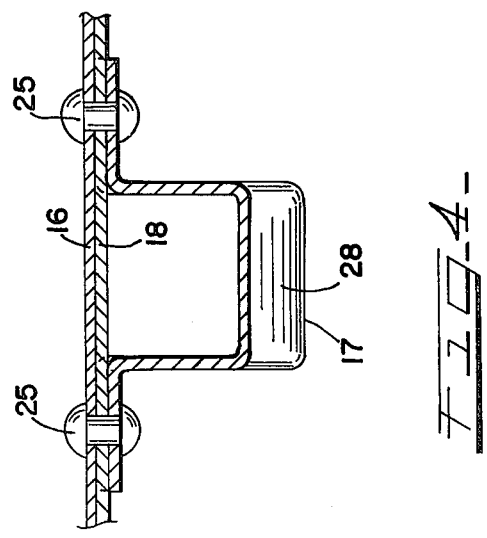

SIDE WALL FOR RAILWAY HOPPER CAR

BACKGROUND OF THE INVENTION

1. Field of the Invention

This invention pertains to open top railway hopper and gondola cars and in particular to an improved wall construction therefor.

2. Description of the Prior Art

The prior art is replete with a variety of railway hopper and gondola car wall constructions. For example, U.S. Pat. Nos. 2,140,268; 3,240,168; 3,772,997 each show side wall constructions and in particular a top chord or sill spanning the length of a railway car and thus supporting the upper portions of the car wall. The present invention is an improvement over these designs.

SUMMARY OF THE INVENTION

The present invention relates to open top hopper or gondola railway cars and in particular to cars used in rotary dumping operations. The present arrangement provides for an improved upper side wall construction for cars of a metal plate configuration including vertical side wall plates and a plurality of longitudinally spaced vertical side posts secured thereto. Top chord members are provided which span the outside top edges of the walls to rigidify and protect the upper portions of the walls as well as to abate lateral wall warping which in turn would reduce the vertical beam strength of the wall. Each of the chord members is of an easily fabricated lightweight formed plate construction and includes an upper essentially tubular closed box rigidifying beam section and an attachment flange depending therefrom. The attachment flange is sandwiched between and secured by mechanical fasteners or the like to a respective side plate and the associated posts. It should be particularly noted that the posts include outwardly offset upper end portions cooperative with the attachment flange so as to present a flat inner surface to which the side plate may be secured while at the same time providing for sandwiching of the attachment flange so as to essentially eliminate bending loads on the mechanical fasteners securing the posts, plate and flange.

BRIEF DESCRIPTION OF THE DRAWINGS

FIG. 1 shows an open top railway hopper car embodying the novel side wall construction of the present invention;

FIG. 2 is an enlarged cross-sectional view taken substantially along line 2—2 in FIG. 1;

FIG. 3 is an enlarged side elevational view partially in section taken substantially as shown in FIG. 1, and FIG. 4 is a horizontal cross-sectional view taken substantially along line 4—4 in FIG. 2.

DESCRIPTION OF THE PREFERRED EMBODIMENT

Turning to consideration of the drawings, there-shown is an open top hopper car 10 having conventional car trucks 11 and including spaced side walls 12 and end walls 13. Each side wall 12 includes an upper chord or sill member 14 spanning the outside top edge of the side wall and a complementary lower chord or sill 15 spanning the bottom edge of the wall and side wall plates 16 and longitudinally spaced side posts 17 extending vertically between and connected to the chords 14 and 15.

As shown in FIG. 2, the longitudinally extending upper chord 14 is of a formed plate tubular configuration which can be fabricated from a single plate and includes outwardly spaced inner and outer vertical wall portions 18 and 19 connected by upper and lower horizontal wall portions 20 and 21, the lower wall 21 being integrally united by welding as at w to the inner vertical wall 18 to provide an essentially closed box beam construction extending substantially throughout the length of the top chord 18. An attachment flange 22, which is a downward extension of the inner vertical wall 18, is also provided and is secured to the side plate 16 and posts 17 by rivets 25 or similar mechanical fasteners. As shown in FIG. 4 the posts are each of a generally rectangular hat-shaped cross-sectional configuration and include laterally extending upper and lower brim flange portions 23 and 24 and an intermediate channel portion 27 and includes an upper tapered portion 28. The upper brim flanges 23 are outwardly offset from the lower brim flanges 24 a distance equal to the thickness of the depending attachment flange 22 such that the latter flange may be sandwiched between the flat side plate 16 and upper brim flange 23 and secured by rivets 25. As indicated in the drawings, the invention further provides that the upper edge 26 of the post 17 abut substantially the breadth of the lower wall 21 such that the neutral axis of the upper chord 18 is horizontally intermediate of the engagement between the chord and the upper edge of the post, thereby cooperatively restraining twisting of the upper chord 18 and further enhancing the rigidity of the wall, particularly during rotary dumping operations.

The foregoing description and drawings merely explain and illustrate the invention and the invention is not limited thereto, except insofar as the appended claims are so limited, as those skilled in the art who have the disclosure before them will be able to make modifications and variations therein without departing from the scope of the invention.

What is claimed is:

1. In an open top railway hopper car having side walls including vertical side plates and a plurality of longitudinally spaced vertical side posts secured thereto, the improvement comprising:
top chord members spanning the outside top edges of the walls, each of said chord members being of a formed plate construction and including an upper rigidifying beam portion of an essentially tubular integrally united cross-sectional configuration and a vertical attachment flange depending therefrom,
said attachment flange being sandwiched between a respective side plate and associated side posts,
mechanical fastening means coupling said attachment flange, side plate and posts,
said post having a top portion and a side portion and said beam portion including a bottom wall overlying and abutably engaging the top portion, and
said flange being attached to the side portion of said post.

2. The invention in accordance with claim 1, and
said beam portion including a bottom wall overlying and abutably engaging the top of said post.

3. The invention in accordance with claim 1, and
said posts being of an essentially hat-shaped cross-sectional configuration and said side portions including laterally extending brim flange portions overlying and engaging said attachment flange.

4. The invention in accordance with claim 1, and
said posts including brim means having laterally extending upper and lower brim flange portions, said upper brim flange portions being outwardly offset from said plate a distance the thickness of said attachment flange.

5. The invention in accordance with claim 1, and
said beam having an inner wall portion and said attachment flange depending from said inner wall portion.

6. The invention in accordance with claim 1, and
said posts having outwardly offset upper attachment portions cooperative with said attachment flange to present a flat inner surface defined by said posts and flange against which the respective side plate is secured.

7. The invention in accordance with claim 1, and
said beam portion having a lower wall portion,
said posts having an upper edge portion abutably engaged against said lower horizontal wall portion to resist axial twisting thereof.

8. The invention in accordance with claim 1, and
said posts each having laterally spaced beam portions, and
said beam portion having a horizontal wall portion,
each of said posts including a vertically extending channel portion intermediate with said brim flange portions and an inwardly tapered upper end channel portion terminating adjacent said horizontal wall portion outward of the neutral axis of said chord member.

9. The invention in accordance with claim 1, and
said posts having an upper edge portion and said chord member having horizontal wall posts,
the neutral axis of said chord member being generally intermediate of the breadth of the abuting engagement between the edge and lower horizontal portions.

10. In an open top railway hopper car having side walls including vertical side plates and a plurality of longitudinally spaced vertical side posts secured thereto, the improvement comprising:

top chord members spanning the outside top edges of the walls, each of said chord members being of a formed plate construction and including an upper rigidifying beam portion of an essentially tubular integrally united cross-sectional configuration and a vertical attachment flange depending therefrom,
said attachment flange being sandwiched between a respective side plate and associated side posts,
mechanical fastening means coupling said attachment flange, side plate and posts, and
said posts including brim means having laterally extending upper and lower brim flange portions, said upper brim flange portions being outwardly offset from said plate a distance the thickness of said attachment flange.

11. The invention in accordance with claim 1, and
said beam portion having an inner wall adjacent the side plate of the car; and
said attachment flange depending from said inner wall.

12. The invention in accordance with claim 11, and
said posts having outwardly offset upper attachment portions cooperative with said attachment flange to present a flat inner surface defined by said posts and flange against which the respective side plate is secured.

13. The invention in accordance with claim 12, and
said posts having an upper edge portion abutably engaged against said lower horizontal wall portion to resist axial twisting thereof.

14. The invention in accordance with claim 13, and
said posts each having laterally spaced brim flange portions, and
said beam portion having a horizontal wall portion,
each of said posts including a vertically extending channel portion intermediate of said brim flange portions and an inwardly tapered upper end channel portion terminating adjacent said horizontal wall portion outward of the neutral axis of said chord member.

15. The invention in accordance with claim 13, and
the neutral axis of said chord member being generally intermediate of the breadth of the abuting engagement between said edge and lower horizontal wall portions.

* * * * *